United States Patent
Sugawara et al.

(10) Patent No.: US 8,699,078 B2
(45) Date of Patent: Apr. 15, 2014

(54) IMAGE PROCESSING APPARATUS, IMAGE PROCESSING METHOD, AND COMPUTER READABLE MEDIUM STORING PROGRAM

(75) Inventors: Masafumi Sugawara, Kanagawa (JP); Kazunori Kurokawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 343 days.

(21) Appl. No.: 13/093,300

(22) Filed: Apr. 25, 2011

(65) Prior Publication Data

US 2012/0127532 A1 May 24, 2012

(30) Foreign Application Priority Data

Nov. 18, 2010 (JP) ................................ 2010-258025

(51) Int. Cl.
*H04N 1/00* (2006.01)
*H04N 1/60* (2006.01)
*G06K 15/00* (2006.01)

(52) U.S. Cl.
USPC ............ 358/1.9; 358/1.1; 358/1.6; 358/2.99; 358/3.06; 358/3.26; 358/1.13; 358/1.16; 358/518; 358/539

(58) Field of Classification Search
None
See application file for complete search history.

(56) References Cited

U.S. PATENT DOCUMENTS 5,383,036 A * 1/1995 Mailloux et al. ............... 358/518
6,414,757 B1 * 7/2002 Salem .......................... 358/3.28
6,441,920 B1 * 8/2002 Smith ............................ 358/1.2
6,879,416 B2 * 4/2005 Shimizu ........................ 358/520
7,209,261 B2 * 4/2007 Krueger et al. ................ 358/1.9
7,551,299 B2 * 6/2009 Ferlitsch ...................... 358/1.13
7,724,393 B2 * 5/2010 Segawa et al. ................. 358/1.9
2002/0131081 A1 * 9/2002 Laverty et al. ............... 358/1.15
2003/0179214 A1 * 9/2003 Saund et al. .................. 345/619
2005/0078329 A1 * 4/2005 Shiokawa et al. ............. 358/1.9
2005/0099642 A1 * 5/2005 Segawa et al. ................. 358/1.9
2006/0023239 A1 * 2/2006 Ferlitsch ...................... 358/1.13

FOREIGN PATENT DOCUMENTS

JP A-11-88706 3/1999

* cited by examiner

*Primary Examiner* — Richard Zhu
(74) *Attorney, Agent, or Firm* — Oliff PLC

(57) ABSTRACT

An image processing apparatus includes an information obtainment unit that obtains image information including data regarding a binary image, a plate-information generating unit that generates plate information, an instruction obtainment unit that obtains a first or second generating instruction, a job-file generating unit, and an output unit that outputs a job file to an image forming apparatus. The job-file generating unit generates, for the first generating instruction, a job file for causing the image forming apparatus to form images using data representing blank for a plate for which the plate information indicates that no image information exists, and data included in image information corresponding to a plate for which the plate information indicates that image information exists, and generates, for the second generating instruction, a job file for causing the image forming apparatus to form an image for each plate using data included in image information.

4 Claims, 4 Drawing Sheets

IMAGE PROCESSING APPARATUS, IMAGE PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-258025 filed Nov. 18, 2010.

BACKGROUND (i) Technical Field

The present invention relates to an image processing apparatus, an image processing method, and a computer readable medium storing a program.

Multiple-value image data items described in page description languages have been converted into binary image data items having halftone dot elements by being subjected to a raster image processing (RIP) process, and plates have been generated from the binary image data items. However, when plates are generated and a proof is checked, in a case in which the plates have problems, the generated plates become unusable. Furthermore, it takes time to generate new plates.

SUMMARY

According to an aspect of the invention, there is provided an image processing apparatus including an information obtainment unit, a plate-information generating unit, an instruction obtainment unit, a job-file generating unit, and an output unit. The information obtainment unit obtains an image information item including a bitmap data item regarding a binary image. The plate-information generating unit specifies, by analyzing an image information item obtained by the information obtainment unit, which plate of a color among plates of multiple colors corresponds to a binary image represented by the image information item, and generates a plate information item indicating whether or not an image information item exists for each of the plates. The instruction obtainment unit obtains a first generating instruction or a second generating instruction. The first generating instruction is an instruction for instructing generation of a job file. The job file is a file for associating the multiple colors of the plates with process colors of an image forming apparatus and for causing the image forming apparatus to collectively form images for the plates. The second generating instruction is an instruction for instructing generation of a job file, for each of the plates, for causing the image forming apparatus to form an image on the basis of a bitmap data item included in an image information item which corresponds to the plate and which has been obtained by the information obtainment unit. When the first generating instruction has been obtained by the instruction obtainment unit, the job-file generating unit generates a blank bitmap data item for a plate, among the plates, for which the plate information item indicates that no image information item exists, and generates a job file for causing the image forming apparatus to form images on the basis of the generated bitmap data item and on the basis of a bitmap data item included in an image information item which has been obtained by the information obtainment unit and which corresponds to a plate, among the plates, for which the plate information item indicates that an image information item exists in such a manner as to associate the multiple colors of the plates with the process colors of the image forming apparatus. When the second generating instruction has been obtained by the instruction obtainment unit, the job-file generating unit generates, for each of the plates, a job file for causing the image forming apparatus to form an image on the basis of a bitmap data item included in an image information item which corresponds to the plate and which has been obtained by the information obtainment unit. The output unit outputs the job file, which has been generated by the job-file generating unit, to the image forming apparatus.

BRIEF DESCRIPTION OF THE DRAWINGS

Exemplary embodiment(s) of the present invention will be described in detail based on the following figures, wherein.

DETAILED DESCRIPTION

Exemplary Embodiment

Figure 1:
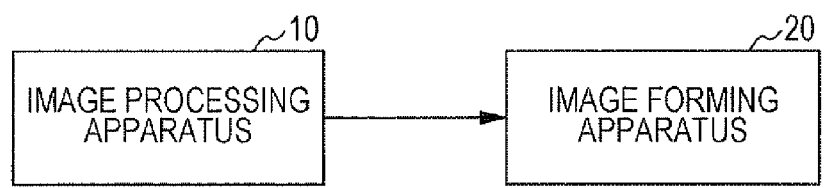
FIG. 1 is a diagram illustrating a configuration of an image processing system in an exemplary embodiment of the present invention.

FIG. 1 is a diagram illustrating a configuration of an image processing system in an exemplary embodiment of the present invention. The image processing system is a system that obtains a proof from a color-image data item which has been generated in a computer. In the present exemplary embodiment, the image processing system includes an image forming apparatus 20 and an image processing apparatus 10.

The image processing apparatus 10 is an apparatus that obtains an image information item (a first image file), which is described in a page description language, or an image information item (a second image file), which is described in 1-bit tagged image file format (TIFF), from a communication line or a computer-readable recording medium, and that outputs, to the image forming apparatus 20, an image data item represented by the first or second image file. Note that, in the present exemplary embodiment, a binary image represented by a second image file is an image on which a plate is to be based, and is subjected to screening processing. The resolution of the binary image represented by the second image file is 2400 dpi.

The image forming apparatus 20 is an apparatus that prints an image represented by a data item which is supplied from the image processing apparatus 10. The image forming apparatus 20 obtains a data item supplied from the image processing apparatus 10, and prints an image represented by the obtained data item.

Configuration of Image Processing Apparatus 10

Figure 2:
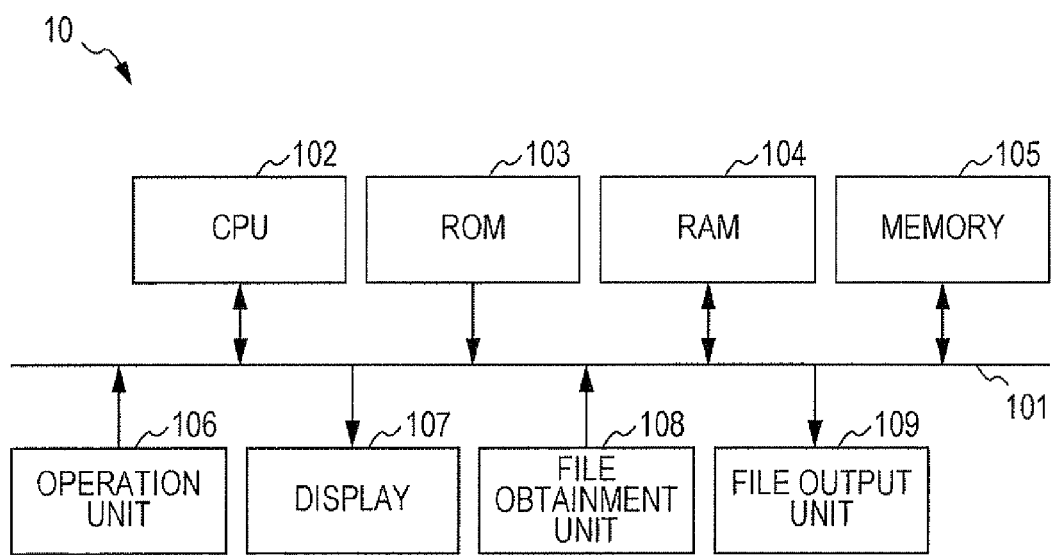
FIG. 2 is a diagram illustrating a hardware configuration of an image processing apparatus.

FIG. 2 is a block diagram illustrating a hardware configuration of the image processing apparatus 10. As illustrated in FIG. 2, individual units are connected to a bus 101. Data items are transmitted/received between the individual units via the bus 101.

A display 107 includes a liquid crystal display that serves as a display device which displays an image. The display 107 displays a menu screen for operating the image processing apparatus 10, various types of messages, images, and so forth under control of a central processing unit (CPU) 102. Note that the display device is not limited to a liquid crystal display. The display device may be another display device such as a display using a cathode ray tube (CRT) or a display using electro luminescence (EL).

An operation unit 106 includes a keyboard or mouse for operating the image processing apparatus 10. A user operates the keyboard or mouse, whereby various types of instructions are input or various types of settings are set for the image processing apparatus 10.

A file obtainment unit 108 is an interface that performs communication via a communication line. The file obtainment unit 108 obtains a first image file or second image files which have been transmitted from another computer. The first image file or the second image files obtained by the file obtainment unit 108 are processed by, for example, the CPU 102.

A file output unit 109 is an interface that performs communication with the image forming apparatus 20, and is connected to the image forming apparatus 20 via a communication cable. The file output unit 109 outputs, to the image forming apparatus 20, bitmap data items that are obtained by performing a RIP process on the first image file or bitmap data items that are included in the second image files.

A memory 105 includes a hard disk device, and stores a program for causing the image processing apparatus 10 to realize functions of an operating system. Furthermore, the memory 105 stores an image processing program for realizing a function of obtaining a first image file or second image files, and of outputting, to the image forming apparatus 20, bitmap data items that are obtained by performing a RIP process on the first image file or bitmap data items that are included in the second image files. Moreover, the memory 105 stores the first image file or the second image files that have been obtained by the file obtainment unit 108, bitmap data items that are obtained by performing a RIP process on the first image file, and so forth.

A read only memory (ROM) 103 stores an initial program loader (IPL). The CPU 102 reads and executes the IPL stored in the ROM 103. When the IPL is executed, the program for realizing the functions of the operating system is read from the memory 105, and is executed. When the program for realizing the functions of the operating system is executed by the CPU 102, execution of the image processing program with the CPU 102 becomes enabled. When the image processing program is executed by the CPU 102, in the image processing apparatus 10, the function of obtaining a first image file or second image files, and of outputting, to the image forming apparatus 20, bitmap data items that are obtained by performing a RIP process on the first image file or bitmap data items that are included in the second image files is realized.

Figure 3:
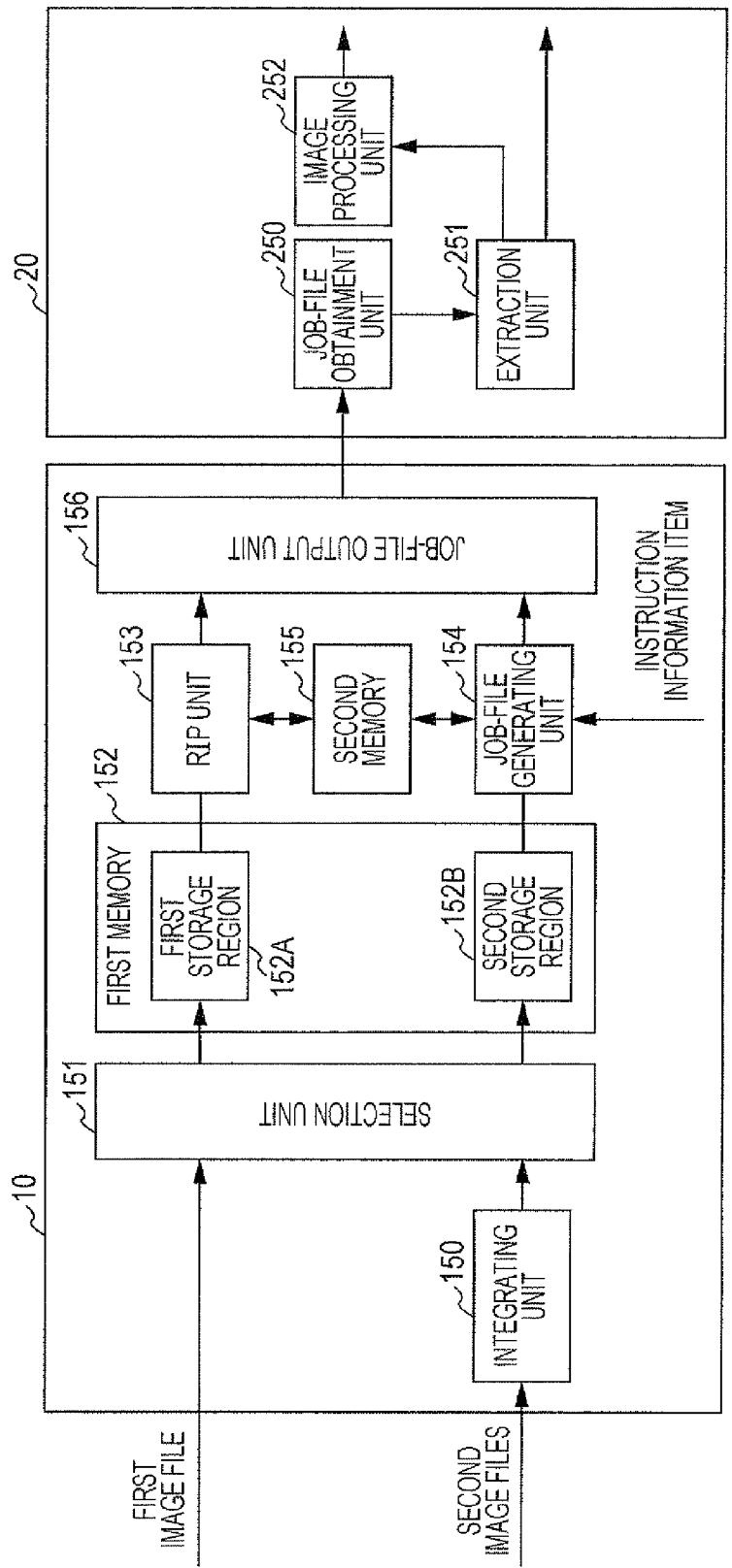
FIG. 3 is a block diagram illustrating a configuration for a function that is realized in the image processing apparatus.

FIG. 3 is a block diagram illustrating a configuration for the function that is realized in the image processing apparatus 10 by executing the image processing program. Note that, in FIG. 3, a configuration for a function realized in the image forming apparatus 20 is also illustrated. The function realized in the image forming apparatus 20 will be described below.

An integrating unit 150 obtains the second image files that have been obtained by the file obtainment unit 108. In the present exemplary embodiment, for each of plates of C (cyan), M (magenta), Y (yellow), and K (key tone, which is black in the present exemplary embodiment), a corresponding one of the second image files is provided. An identification item indicating a plate among the plates of C, M, Y, and K is added to each of the second image files corresponding to the individual plates.

Note that the configuration of the integrating unit 150 is not limited to a configuration in which all of the second image files corresponding to the four individual plates are obtained. For example, when one-color printing is performed using black, only a second image file corresponding to the plate of K is supplied to the file obtainment unit 108. The integrating unit 150 obtains the supplied second image file corresponding to the plate of K. Furthermore, when two-color printing is performed using C and K, only second image files corresponding to the plates of C and K are supplied to the file obtainment unit 108. The integrating unit 150 obtains the supplied second image files corresponding to the plates of C and K.

When the integrating unit 150 obtains the second image files, the integrating unit 150 extracts the identification information items that are added to the obtained second image files, and generates a plate information item indicating colors of plates corresponding to the obtained second image files. In other words, the integrating unit 150 is an example of a plate-information generating unit that generates a plate information item. For example, in a case in which the integrating unit 150 has obtained second image files corresponding to the plates of C and K, when the integrating unit 150 extracts identification information items added to the obtained second image files, the identification information items indicate that second image files corresponding to the plates of C and K have been obtained. On the basis of the extracted identification information items, the integrating unit 150 associates "1", which indicates the existence of a plate, with C and K, and associates "0", which indicates the non-existence of a plate, with M and Y, thereby generating a plate information item of "CMYK=1001". Note that, in a case in which only a second image file corresponding to the plate of K has been obtained, an expression "CMYK=0001" is generated as a plate information item. When the integrating unit 150 generates a plate information item, the integrating unit 150 integrates the generated plate information item and the obtained second image files corresponding to the plates, and supplies the plate information item and the second image files to a selection unit 151.

The selection unit 151 obtains the plate information item and the second image files that have been integrated. Furthermore, the selection unit 151 may obtain the first image file that has been obtained by the file obtainment unit 108. When the selection unit 151 obtains the first image file, the selection unit 151 supplies the obtained first image file to a first memory 152. Additionally, when the selection unit 151 obtains the plate information item and the second image files, the selection unit 151 supplies the plate information item and the second image files, which have been obtained, to the first memory 152.

The first memory 152 has a first storage region 152A in which the first image file is stored. Furthermore, the first memory 152 has a second storage region 152B in which the plate information item and the second image files are stored. When the first image file is supplied from the selection unit 151 to the first memory 152, the first memory 152 stores the supplied first image file in the first storage region 152A. Moreover, when the plate information item and the second image files are supplied from the selection unit 151 to the first memory 152, the first memory 152 stores the plate information item and the second image files, which have been supplied, in the second storage region 152B.

A RIP unit 153 is a unit that subjects, to a RIP process, the first image file stored in first storage region 152A. The RIP unit 153 generates a bitmap data item for each of the plates of C, M, Y, and K by performing a RIP process, and causes a second memory 155 to store the generated bitmap data item. Note that, in the present exemplary embodiment, the resolution of a bitmap data item that is generated by performing a RIP process is 600 dpi, and the gradation of one pixel is represented by eight bits. Furthermore, the RIP unit 153 generates a job file including the bitmap data items that are stored in the second memory 155, and supplies the generated job file to a job-file output unit 156. Note that the RIP unit 153 also has functions of a color management system (CMS), and adjusts the gradation (tone) of a bitmap data item so that the gradation matches with a gradation in the image forming apparatus 20. Accordingly, in a case of subjecting an image file, which has been input to the image processing apparatus 10, to image processing along a route passing through the RIP unit 153 illustrated in FIG. 3, and of outputting images from the image forming apparatus 20, the tone of the image file that has been input to the image processing apparatus 10 can be corrected. In contract, in a case of processing an image file along the route passing through the RIP unit 153, the gradation of one pixel is represented by multiple values (eight bits in the present exemplary embodiment). Accordingly, this is not suitable for checking whether or not images represented by the image file that has been input to the image processing apparatus 10 have moire. Note that the second image files may be supplied to the RIP unit 153, bitmap data items regarding multiple-value images may be generated, and color adjustment using the functions of the CMS may be performed.

A job-file generating unit 154 obtains the plate information item and the second image files that are stored in the second storage region 152B, and causes the second memory 155 to store the plate information item and the second image files that have been obtained. Moreover, the job-file generating unit 154 selects a combining mode or a separated plate mode in accordance with an instruction information item that has been input. In the combining mode, images are to be collectively formed by the image forming apparatus 20 on the basis of the bitmap data items included in the second image files, which are stored in the second memory 155, corresponding to the individual plates in such a manner as to associate the colors of the individual plates with process colors of the image forming apparatus 20. In the separated plate mode, an image is to be formed by the image forming apparatus 20 for each of the plates on the basis of the bitmap data item that is included in a corresponding one of the second image files. In other words, the job-file generating unit 154 is an example of an instruction obtainment unit that obtains an instruction information item.

The job-file generating unit 154 is an example of a job-file generating unit that generates a job file. When the combining mode is selected, the job-file generating unit 154 extracts, from the second image files, bitmap data items for plates that are associated with "1" in the plate information item. Furthermore, when there are plates that are associated with "0" in the plate information item, the job-file generating unit 154 generates blank bitmap data items for the plates that are associated with "0" in the plate information item. The job-file generating unit 154 generates a job file including the extracted bitmap data items and the generated blank bitmap data items, and supplies the generated job file to the job-file output unit 156. Accordingly, because plates that are associated with "0" in the plate information item exist, blank plates are placed in a sequence of plates to be printed. Thus, a malfunction caused by the difference between plates that are printed in reality and plates that are desired to be printed does not occur.

In contrast, when the separated plate mode is selected, the job-file generating unit 154 generates a job file for each of the second image files, which are stored in the second memory 155, corresponding to the individual plates, and supplies the generated job file to the job-file output unit 156. For example, when second image files corresponding to the plates of C and K are stored in the second memory 155, only a job file including the second image file corresponding to the plate of C and a job file including the second image file corresponding to the plate of K are generated. Accordingly, the plate information item indicates that certain plates do not exist, and blank sheets are prevented from being unnecessarily output for the plates. For example, in a system in which a user is charged every time the user causes the image forming apparatus 20 to output a sheet, because a blank sheet is not printed, the user is prevented from being charged for outputting a blank sheet.

The second memory 155 stores the bitmap data items that have been generated by performing a RIP process or the plate information item and the second image files, which are described above.

The job-file output unit 156 is a unit that outputs, to the image forming apparatus 20, the job file that has been supplied from the RIP unit 153 or the job file that has been supplied from the job-file generating unit 154. The job-file output unit 156 supplies the supplied job file to the file output unit 109. In other words, the job-file output unit 156 is an example of an output unit that outputs a job file.

Configuration of Image Forming Apparatus 20

Figure 4:
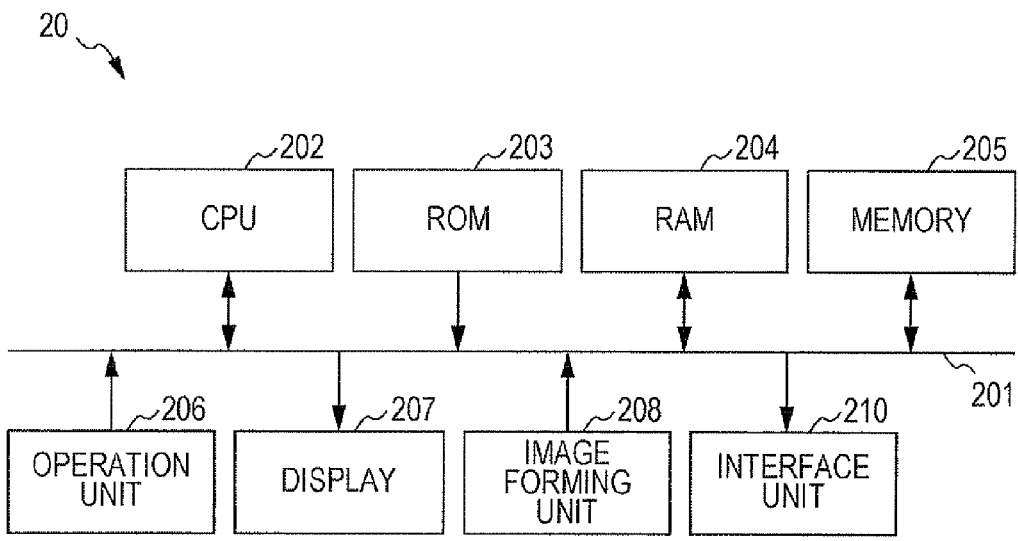
FIG. 4 is a diagram illustrating a hardware configuration of an image forming apparatus.

FIG. 4 is a block diagram illustrating a hardware configuration of the image forming apparatus 20. As illustrated in FIG. 4, individual units are connected to a bus 201. Data items are transmitted/received between the individual units via the bus 201.

An operation unit 206 includes various types of keys for operating the image forming apparatus 20. A user operates the keys, whereby various types of instructions are input or various types of settings are set for the image forming apparatus 20. A display 207 includes a display device such as a liquid crystal display. The display 207 displays a menu screen for operating the image forming apparatus 20, various types of messages, and so forth under control of a CPU 202.

An interface unit 210 is an interface that performs communication with the image processing apparatus 10, and is connected to the image processing apparatus 10 using the communication cable. The interface unit 210 obtains a job file supplied from the image processing apparatus 10.

An image forming unit 208 includes an image forming engine that forms toner images on a sheet using an electrophotographic method. The image forming engine transfers toner images having individual colors of C, M, Y, and K, which are the process colors, onto a sheet on the basis of supplied bitmap data items. The image forming engine applies heat and pressure to the toner images that have been transferred onto the sheet, thereby fixing the toner images. After that, the image forming engine outputs the sheet, on which the toner images are formed, to the outside of the image forming apparatus 20. Note that the image forming unit 208 may use an image forming method, such as an inkjet method, other than the electrophotographic method. The image forming unit 208 may be provided with a color (a spot color) other than C, M, Y, and K that are the process colors. In such a case, even when image files that are input to the image processing apparatus 10 include an image file corresponding to a plate other than the plates of C, M, Y, and K, the image forming unit 208 can handle the image file.

A memory 205 includes a hard disk device, and stores the job file obtained by the interface unit 210.

A ROM 203 stores a control program that is to be executed by the CPU 202. The CPU 202 reads the control program stored in the ROM 203, and executes the control program using a RAM 204 as a work area. When the control program is executed by the CPU 202, the individual units of the image forming apparatus 20 are controlled by the CPU 202, whereby the image forming apparatus 20 operates as a so-called printer.

Note that, in FIG. 3, a configuration for the function that is realized in the image forming apparatus 20 in the present exemplary embodiment is illustrated. A job-file obtainment unit 250 is a unit that obtains a job file supplied from the image processing apparatus 10, and supplies the obtained job file to an extraction unit 251.

The extraction unit 251 is a unit that extracts bitmap data items from the job file supplied from the job-file obtainment unit 250. When the resolution of the bitmap data items included in the supplied job file is 600 dpi, i.e., when the bitmap data items included in the supplied job file are bitmap data items generated by the RIP unit 153, the extraction unit 251 supplies, to an image processing unit 252, the bitmap data items, which are included in the job file, for the individual plates of C, M, Y, and K.

Furthermore, when the resolution of the bitmap data items included in the job file is 2400 dpi, i.e., when the bitmap data items included in the supplied job file are bitmap data items included in image files (second image files) described in 1-bit TIFF, the extraction unit 251 supplies the bitmap data items, which are included in the obtained job file, to the image forming unit 208.

The image processing unit 252 subjects the bitmap data items, which have been supplied from the extraction unit 251, to screen processing, and supplies the bitmap data items, which have been subjected to screen processing, to the image forming unit 208.

Operations in Exemplary Embodiment

Next, operations in the present exemplary embodiment will be described. Note that, in the description given below, first, an operation that is performed when the image processing apparatus 10 obtains a first image file will be described. Next, an operation that is performed when the image processing apparatus 10 obtains second image files will be described.

Operation Performed when First Image File is Obtained

Figure 5:
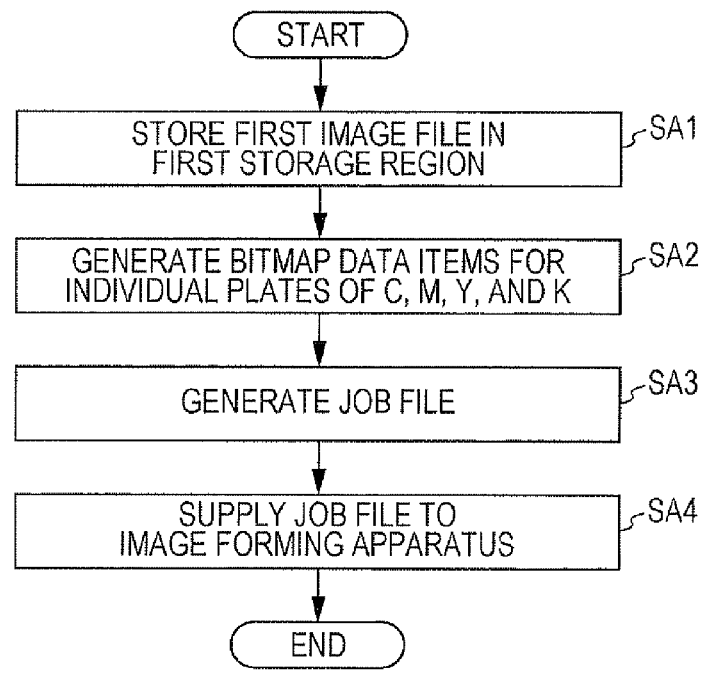
FIG. 5 is a flow diagram illustrating a flow of a process performed by the image processing apparatus.

FIG. 5 is a flow diagram illustrating a flow of a process that is performed when the image processing apparatus 10 obtains a first image file. When a first image file is transmitted to the image processing apparatus 10 via a communication line, the file obtainment unit 108 obtains the transmitted first image file. The first image file obtained by the file obtainment unit 108 is supplied to the selection unit 151, and then stored in the first storage region 152A (step SA1). When the first image file is stored in the first storage region 152A, the RIP unit 153 subjects the first image file, which is stored in the first storage region 152A, to a RIP process or a color adjustment process, thereby generating bitmap data items for the individual plates of C, M, Y, and K (step SA2). The RIP unit 153 causes the second memory 155 to store the generated bitmap data items. When the bitmap data items for the individual plates of C, M, Y, and K are stored, the RIP unit 153 generates a job file including the bitmap data items for the individual plates (step SA3). The generated job file is supplied to the image forming apparatus 20 (step SA4). More specifically, the generated job file is supplied to the job-file output unit 156. The job-file output unit 156 supplies the supplied job file to the file output unit 109. When the file output unit 109 obtains the job file, the file output unit 109 supplies the obtained job file to the image forming apparatus 20.

When the job file is obtained by the interface unit 210, the obtained job file is supplied from the job-file obtainment unit 250 to the extraction unit 251. The extraction unit 251 extracts the bitmap data items, which are included in the supplied job file, for the individual plates of C, M, Y, and K. When the resolution of the extracted bitmap data items is 600 dpi, i.e., when the extracted bitmap data items are bitmap data items generated by the RIP unit 153, the extraction unit 251 supplies the bitmap data items for the individual plates to the image processing unit 252.

The image processing unit 252 subjects the bitmap data items, which have been supplied from the extraction unit 251, for the individual plates to screen processing, thereby generating bitmap data items having a resolution of 2400 dpi for the plates of C, M, Y, and K on a plate-by-plate basis. The image processing unit 252 supplies the generated bitmap data items for the individual plates to the image forming unit 208. The image forming unit 208 generates toner images as images represented by the supplied bitmap data items, and transfers the generated toner images onto a sheet so that the toner images overlap each other. After that, the image forming unit 208 performs a fixing process, and outputs, to the outside of the image forming apparatus 20, the sheet on which the images are formed.

In the present exemplary embodiment, because images for the individual plates of C, M, Y, and K are formed so as to overlap each other, a user checks colors using a proof that is output.

Operation Performed when Second Image Files are Obtained

Next, an operation that is performed when second image files are obtained will be described. Note that, in the description given below, a case in which a second image file corresponding to the plate of C and a second image file corresponding to the plate of K are transmitted to the image processing apparatus 10 is supposed, and an operation that is performed in the case will be described.

Figure 6:
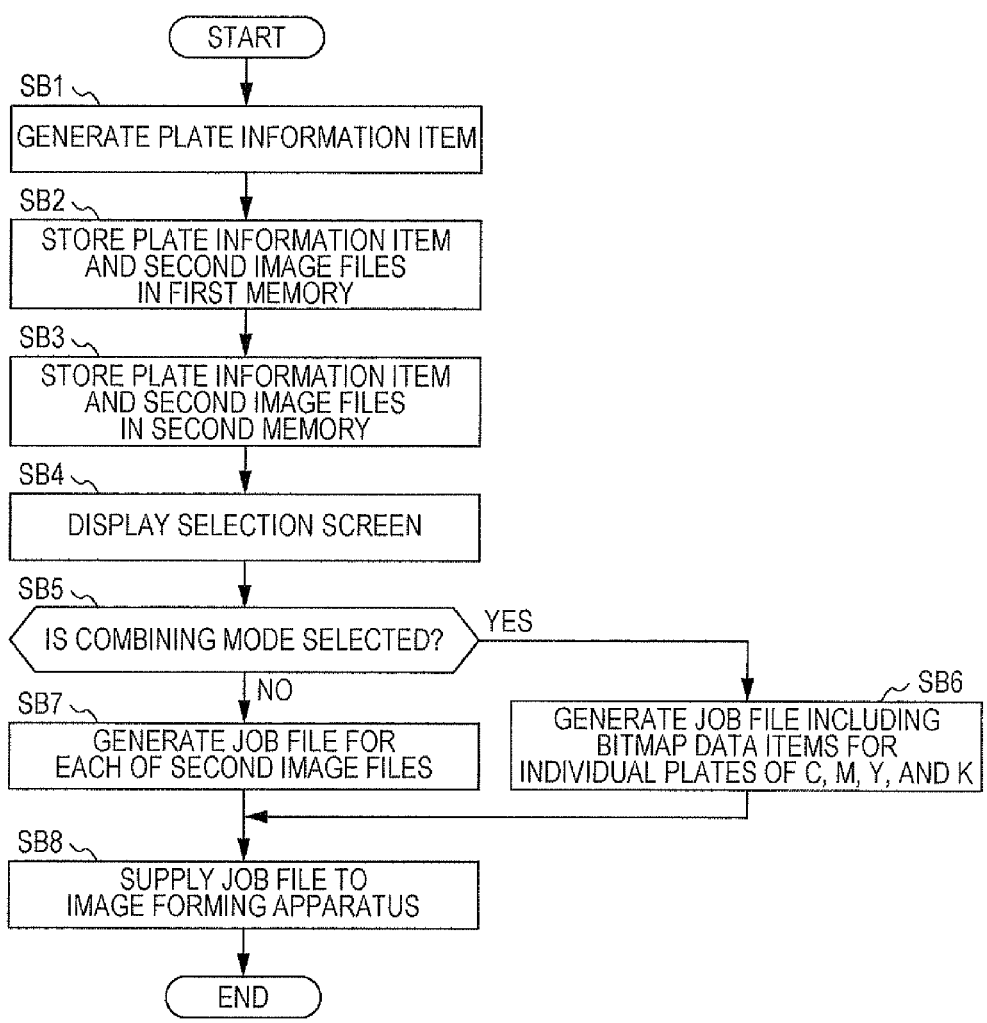
FIG. 6 is a flow diagram illustrating a flow of a process performed by the image processing apparatus.

FIG. 6 is a flow diagram illustrating a flow of a process that is performed when the image processing apparatus 10 obtains second image files. When a second image file corresponding to the plate of C and a second image file corresponding to the plate of K are transmitted via a communication line to the image processing apparatus 10, the file obtainment unit 108 obtains the transmitted second image files. The second image files obtained by the file obtainment unit 108 are supplied to the integrating unit 150.

When the integrating unit 150 obtains the second image files, the integrating unit 150 extracts identification information items that are added to the obtained second image files, and generates a plate information item indicating plates corresponding to the obtained second image files (step SB1). Here, when the identification information items added to the obtained second image files are extracted, the identification information items indicate that second image files corresponding to the plates of C and K have been obtained. On the basis of the extracted identification information items, the integrating unit 150 associates "1", which indicates that there is a plate, with C and K, and associates "0", which indicates there is no plate, with M and Y, thereby generating a plate information item of "CMYK=1001". When the integrating unit 150 generates a plate information item, the integrating unit 150 integrates the generated plate information item and the obtained second image files corresponding to the plates, and supplies the plate information item and the second image files to the selection unit 151.

When the selection unit 151 obtains the plate information item and the second image files that have been supplied, the selection unit 151 supplies, to the first memory 152, the plate information item and the second image files that are obtained. In the first memory 152, the plate information item and the second image files are stored in the second storage region 152B (step SB2). When the plate information item and the second image files are stored in the second storage region 152B, the job-file generating unit 154 obtains the plate information item and the second image files that are stored in the second storage region 152B, and causes the second memory 155 to store the plate information item and the second image files that are obtained (step SB3). When the job-file generating unit 154 causes the second memory 155 to store the plate information item and the second image files, the job-file generating unit 154 controls the display 107 to display a selection screen for causing a user to select the combining mode or the separated plate mode (step SB4).

When the user operates the operation unit 106 in accordance with the display and the combining mode is selected, an instruction information item regarding an instruction for setting the combining mode is supplied to the job-file generating unit 154. When the instruction information item regarding an instruction for setting the combining mode is supplied to the job-file generating unit 154 (YES in step SB5), the job-file generating unit 154 generates a job file including the bitmap data items for the individual plates of C, M, Y, and K (step SB6). More specifically, the job-file generating unit 154 extracts, from the second image files, bitmap data items for the plates of C and K that are associated with "1" in the plate information item. Furthermore, the job-file generating unit 154 generates blank bitmap data items for the places of M and Y that are associated with "0" in the plate information item. The job-file generating unit 154 generates a job file including the extracted bitmap data items and the generated blank bitmap data items (step SB6), and supplies the generated job file to the job-file output unit 156. The job-file output unit 156 supplies the supplied job file to the file output unit 109. When the file output unit 109 obtains the job file, the file output unit 109 supplies the obtained job file to the image forming apparatus 20 (step SB8).

When the job file is obtained by the interface unit 210, the obtained job file is supplied to the job-file obtainment unit 250, and supplied to the extraction unit 251. The extraction unit 251 extracts the bitmap data items, which are included in the supplied job file, for the individual plates of C, M, Y, and K, and supplies the extracted bitmap data items to the image forming unit 208. The image forming unit 208 generates toner images as images represented by the supplied bitmap data items, and transfers the generated toner images having the individual colors onto a sheet so that the toner images overlap each other. After that, the image forming unit 208 performs a fixing process, and outputs, to the outside of the image forming apparatus 20, the sheet on which the images are formed. Here, the bitmap data items for the plates of C and K are included in the job file, and the blank bitmap data items are included for the plates of M and Y. A toner image for the plate of C and a toner image for plate of K are transferred onto a sheet, and fixed. The sheet on which the images are formed is output to the outside of the image forming apparatus 20.

Supposing that only the obtained bitmap data items for the plates of C and K are included in the job file, the number of plates is short of four, which is the number of plates of C, M, Y, and K. Accordingly, there is a risk of forming images using the other colors on the basis of the included bitmap data items. However, in the present exemplary embodiment, because the bitmap data items corresponding to the four plates are included, such a problem does not occur.

In contrast, when the user selects the separated plate mode, an instruction information item regarding an instruction for setting the separated plate mode is supplied to the job-file generating unit 154. When the instruction information regarding an instruction for setting the separated plate mode is supplied to the job-file generating unit 154 (NO in step SB5), the job-file generating unit 154 generates a job file including the second image file corresponding to the plate of C and a job file including the second image file corresponding to the plate of K (step SB7), and supplies the individual generated job files to the job-file output unit 156. The job-file output unit 156 supplies the supplied job files to the file output unit 109. When the file output unit 109 obtains the job files, the file output unit 109 supplies the obtained job files to the image forming apparatus 20 (step SB8).

When the job files are obtained by the interface unit 210, the obtained job files are supplied to the job-file obtainment unit 250, and supplied to the extraction unit 251. The extraction unit 251 extracts, from the job file including the second image file corresponding to the plate of C, the bitmap data item included in the second image file, and supplies the extracted bitmap data item to the image forming unit 208. Furthermore, the extraction unit 251 extracts, from the job file including the second image file corresponding to the plate of K, the bitmap data item included in the second image file, and supplies the extracted bitmap data item to the image forming unit 208. The image forming unit 208 generates, using black toner, toner images as images represented by the supplied bitmap data items, and transfers the generated toner images for the individual plates onto different sheets. After that, the image forming unit 208 performs a fixing process, and outputs, to the outside of the image forming apparatus 20, the sheets on which the images are formed.

Here, to the image forming apparatus 20, the job file including the second image file corresponding to the plate of C and the job file including the second image file corresponding to the plate of K are supplied. A job file including a second image file corresponding to the plate of M and a job file including a second image file corresponding to the plate of Y are not supplied. Accordingly, the sheet on which the black-and-white image is formed for the plate of C and the sheet on which the black-and-white image is formed for the plate of K are output to the outside of the image forming apparatus 20.

As described above, when the image processing apparatus 10 obtains second image files, in the image forming apparatus 20, images are formed on a sheet using bitmap data items (data items representing images for the plates) included in the second image files. Accordingly, a screen in a case of performing printing using the plates is reproduced. Note that, in the combining mode, blank bitmap data items are generated for the plates that have not been obtained by the image processing apparatus 10. Accordingly, in the image forming apparatus 20, an image is formed using cyan toner for the plate of C, and an image is formed using black toner for the plate of K. Images are not formed using toners of the other colors. In the image forming apparatus 20, images for the individual plates are formed so as to overlap each other, and output. Accordingly, a user checks moire in a case in which printing is performed using the plates.

In contrast, in the separated plate mode, because black-and-white images for the individual plates are formed on a plate-by-plate basis, the user checks moire that is not easily recognizable in color images. Furthermore, in the separated plate mode, regarding the plates corresponding to second image files that are not obtained by the image processing apparatus 10, because the second image files corresponding to the plates are not output to the image forming apparatus 20, images for the plates are not formed on sheets.

MODIFICATIONS

The exemplary embodiment of the present invention is described above. However, the present invention is not limited to the above-described exemplary embodiment, and may be applied to other various exemplary embodiments. For example, the present invention may be applied by modifying the above-described exemplary embodiment as described below. Note combinations of the above-described exemplary embodiment and modifications given below may be made.

In the above-described exemplary embodiment, an example in which the present invention is applied to image files corresponding to the four plates of C, M, Y, and K is described. However, the present invention may be applied to image files corresponding to five or more plates of spot colors in addition to C, M, Y, and K.

In the above-described exemplary embodiment, an image information item that is stored in the first storage region 152A and that is processed by the RIP unit 153 is not limited to an image information item described in a page description language. For example, an image information item described item in TIFF in which the gradation is represented by multiple values, or an image information item including bitmap data items in which the gradation is represented by multiple values may be processed by the RIP unit 153, whereby bitmap data items regarding multiple-value images may be generated.

In the above-described exemplary embodiment, which second image file corresponds to which plate is determined in accordance with identification information items. However, which second image file corresponds to which plate may be determined in accordance with the file names of second image files. For example, "C", "M", "Y", and "K" are added to the ends of the file names for the plates of C, M, Y, and K, respectively. Which second image file corresponds to which plate may be determined in accordance with the last letters or first letters, and a plate information item may be generated.

In the above-described exemplary embodiment, when the image processing program is executed, a function of obtaining a first image file, of performing a RIP process on the first image file to obtain bitmap data items, and of supplying the bitmap data items, which have been obtained by performing a RIP process, to the image forming apparatus 20 is realized. However, when the image processing program is executed, this function may not be realized.

In the above-described exemplary embodiment, an instruction for causing the image forming apparatus 20 to perform a process, such as an instruction for performing printing on both sides of a sheet, or an instruction for performing color correction in the image forming apparatus 20, may be included in a job file.

In the above-described exemplary embodiment, when a job file including second image files is supplied to the image forming apparatus 20, the image forming apparatus 20 may adjust, by adjusting the intensity of light in a case of forming electrostatic latent images on a photoconductor, the density of toner images to be formed on a sheet.

In the above-described exemplary embodiment, when the image processing apparatus 10 obtains second image files corresponding to all of the plates of C, M, Y, and K, the image processing apparatus 10 may integrate the obtained second image files without generating a plate information item, and may store the second image files in the second storage region 152B. Furthermore, with this configuration, regarding the second image files stored in the second storage region 152B, the job-file generating unit 154 may separate bitmap data items and headers from each other. The job-file generating unit 154 may subject the bitmap data items to a compression process, and may cause the second memory 155 to store the bitmap data items. Note that, in the configuration, when the combining mode is selected, the compressed and stored bitmap data items are decompressed. After the headers are added to the bitmap data items, the bitmap data items are included in a job file. In contrast, when the separated plate mode is selected, the compressed and stored bitmap data items are decompressed, and the headers are added to the bitmap data items, thereby generating second image files. Job files including the generated second image files are generated.

The above-described image processing program may be provided in a state in which the image processing program is stored in a computer-readable recording medium such as a magnetic recording medium (a magnetic tape, a magnetic disk (a hard disk drive (HDD) or a flexible disk (FD)), or the like), an optical recording medium (an optical disk (a compact disc (CD) or a digital versatile disk (DVD)), or the like), a magneto-optical recording medium, or a semiconductor memory. The image processing program may be installed in the image processing apparatus 10. Alternatively, the image processing program may be downloaded via a communication line, and may be installed.

In the above-described exemplary embodiment, an interface that can access one of the recording media or the semiconductor memory, which are described above, may be provided in the image processing apparatus 10. A first image file or second image files may be obtained from one of the recording media or the semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an information obtainment unit that obtains an image information item including a bitmap data item regarding a binary image;
a plate-information generating unit that specifies, by analyzing an image information item obtained by the information obtainment unit, which plate of a color among plates of a plurality of colors corresponds to a binary image represented by the image information item, and that generates a plate information item indicating whether or not an image information item exists for each of the plates;
an instruction obtainment unit that obtains a first generating instruction or a second generating instruction, the first generating instruction being an instruction for instructing generation of a job file, the job file being a file for associating the plurality of colors of the plates with process colors of an image forming apparatus and for causing the image forming apparatus to collectively form images for the plates, the second generating instruction being an instruction for instructing generation of a job file, for each of the plates, for causing the image forming apparatus to form an image on the basis of a bitmap data item included in an image information item which corresponds to the plate and which has been obtained by the information obtainment unit;

a job-file generating unit that:
generates, when the first generating instruction has been obtained by the instruction obtainment unit and when the plate information item indicates that there is no image information item that exists for one or more of the plates, a blank bitmap data item for each of the one or more plates generates, when the plate information item indicates that an image information item exists for at least one of the plates, a job file for causing the image forming apparatus to form images on the basis of the generated bitmap data item and on the basis of a bitmap data item included in an image information item which has been obtained by the information obtainment unit and which corresponds to the at least one plate, among the plates, in such a manner as to associate the plurality of colors of the plates with the process colors of the image forming apparatus, and generates, when the second generating instruction has been obtained by the instruction obtainment unit, for each of the plates, a job file for causing the image forming apparatus to form an image on the basis of a bitmap data item included in an image information item which corresponds to the plate and which has been obtained by the information obtainment unit; and an output unit that outputs the job file, which has been generated by the job-file generating unit, to the image forming apparatus.

2. The image processing apparatus according to claim 1, wherein the information obtainment unit obtains an image information item including a bitmap data item regarding a multiple-value image or an image information item in which an image is described in a page description language, and wherein the job-file generating unit generates, for the plates, bitmap data items regarding multiple-value images on the basis of image information items which correspond to the plates and which have been obtained by the information obtainment unit, and generates a job file for causing the image forming apparatus to form images on the basis of the generated bitmap data items regarding the multiple-value images.

3. An image processing method comprising:
obtaining an image information item including a bitmap data item regarding a binary image;

specifying, by analyzing an obtained image information item, which plate of a color among plates of a plurality of colors corresponds to a binary image represented by the image information item, and generating a plate information item indicating whether or not an image information item exists for each of the plates;

obtaining a first generating instruction or a second generating instruction, the first generating instruction being an instruction for instructing generation of a job file, the job file being a file for associating the plurality of colors of the plates with process colors of an image forming apparatus and for causing the image forming apparatus to collectively form images for the plates, the second generating instruction being an instruction for instructing generation of a job file, for each of the plates, for causing the image forming apparatus to form an image on the basis of a bitmap data item included in an obtained image information item which corresponds to the plate;

generating, when the first generating instruction has been obtained and when the plate information item indicates that there is no image information item, that exists for one or more of the plates, a blank bitmap data item for the one or more plates;

generating, when the plate information item indicates that an image information item exists for at least one of the plates, a job file for causing the image forming apparatus to form images on the basis of the generated bitmap data item and on the basis of a bitmap data item included in an obtained image information item which corresponds to the at least one plate in such a manner as to associate the plurality of colors of the plates with the process colors of the image forming apparatus; and generating, when the second generating instruction has been obtained, for each of the plates, a job file for causing the image forming apparatus to form an image on the basis of a bitmap data item included in an obtained image information item which corresponds to the plate; and outputting the generated job file to the image forming apparatus.

4. A non-transitory computer readable medium storing a program causing a computer to execute a process, the process comprising:

obtaining an image information item including a bitmap data item regarding a binary image;

specifying, by analyzing an obtained image information item, which plate of a color among plates of a plurality of colors corresponds to a binary image represented by the image information item, and generating a plate information item indicating whether or not an image information item exists for each of the plates;

obtaining a first generating instruction or a second generating instruction, the first generating instruction being an instruction for instructing generation of a job file, the job file being a file for associating the plurality of colors of the plates with process colors of an image forming apparatus and for causing the image forming apparatus to collectively form images for the plates, the second generating instruction being an instruction for instructing generation of a job file, for each of the plates, for causing the image forming apparatus to form an image on the basis of a bitmap data item included in an obtained image information item which corresponds to the plate;

generating, when the first generating instruction has been obtained and when the plate information item indicates that there is no image information item that exists for one or more of the plates, a blank bitmap data item for the one or more plates;

generating, when the plate information item indicates that an image information item exists for at least one of the plates, a job file for causing the image forming apparatus to form images on the basis of the generated bitmap data item and on the basis of a bitmap data item included in an obtained image information item which corresponds to the at least one plate in such a manner as to associate the plurality of colors of the plates with the process colors of the image forming apparatus; and outputting the generated job file to the image forming apparatus.

* * * * *